United States Patent Office 3,429,378
Patented Feb. 25, 1969

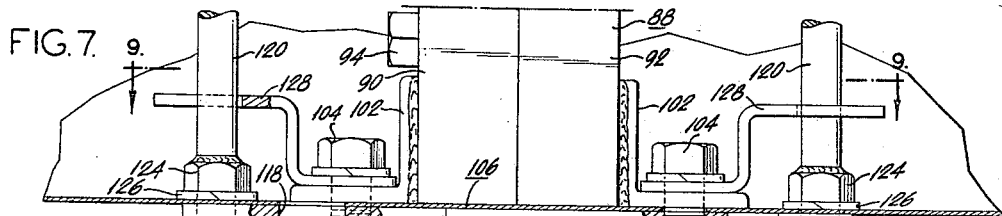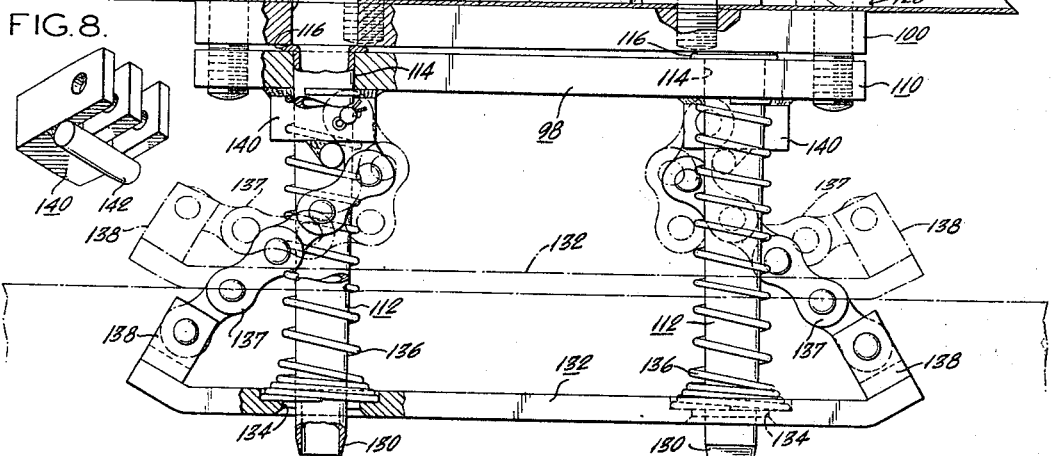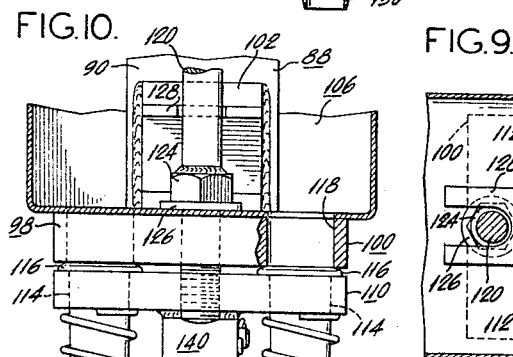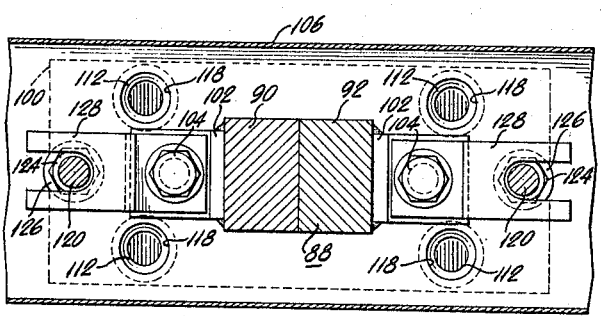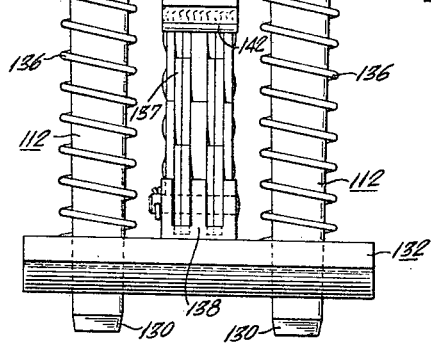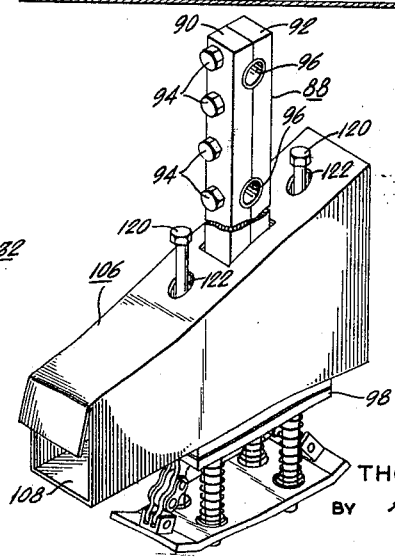
INVENTOR
THOMAS C. MASCARO
BY Howson & Howson
ATTYS.

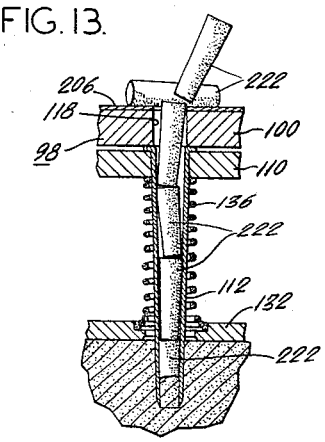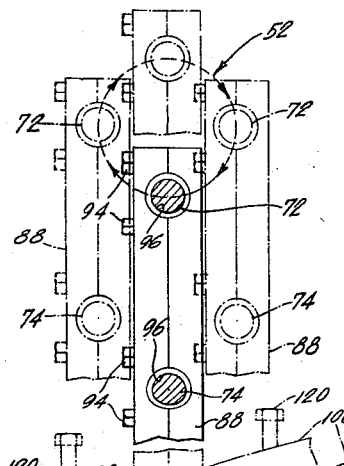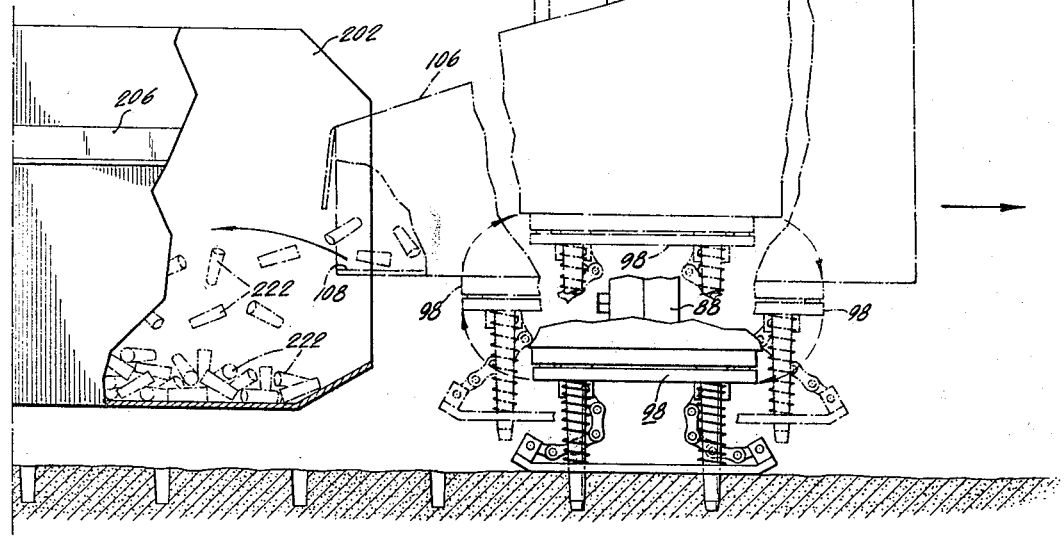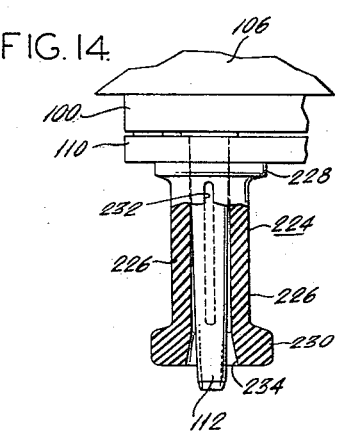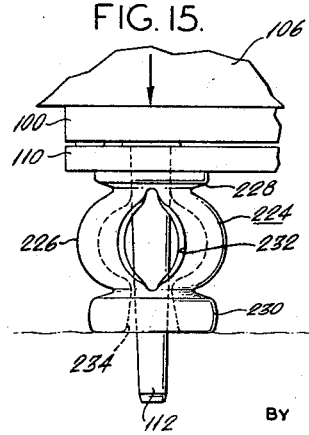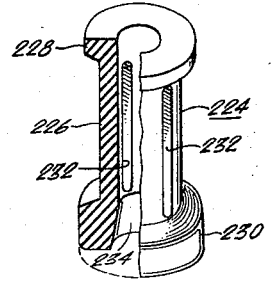

3,429,378
TURF-AERATING APPARATUS
Thomas C. Mascaro, West Point, Pa. 19486
Filed May 18, 1965, Ser. No. 456,691
U.S. Cl. 172—22                                   2 Claims
Int. Cl. A01b *45/02, 39/12*

ABSTRACT OF THE DISCLOSURE

A turf-aerating mechanism mounted on a wheeled carriage and including a pair of vertically spaced transverse crankshafts having a plurality of crank arms depending downwardly therefrom, a tine assembly on each crank arm including a plurality of hollow tines for punching and removing turf cores, a core chute on each tine assembly communicating with the hollow tines, and a removable collecting box adjacent the chutes for collecting turf cores punched by the tines. The invention further includes a coring tine assembly comprising upper and lower clamping plates between which the flanges of a plurality of coring tines are secured, the coring tines each having an overlying unitary cylindrical elastic turf detaining element which is vertically slotted to facilitate compression during the punching stroke of the tine.

---

The present invention relates generally to turf-conditioning equipment and more particularly to a novel turf-aerating apparatus for punching and collecting turf cores.

The aeration of lawn areas is widely practiced, especially in the maintenance of golf course fairways and greens, to permit air, water, chemicals and fertilizer to reach the grass roots. At one time aeration involved the use of puncturing devices which formed spaced vertical openings by displacement of the turf. This type of treatment, however, actually rendered the turf less penetrable to the entrance of air, moisture and treating materials due to the compacting action of the displacing spike or punch on the turf adjacent the openings. It is now generally acknowledged that for the most beneficial aeration, a core or plug of turf should be removed in the forming of the openings.

Although the desireability of removing turf in forming aerating cavities has been recognized for some time, apparatus has not heretofore been developed for effectively carrying out such treatment without impairing the usefulness of the lawn surface, for example as a golf putting green. A common short-coming of prior devices has been their tendency to disturb the grass in the vicinity of the openings, necessitating further treatment to restore a level surface. Additionally, devices heretofore developed have deposited any removed turf on the lawn surface from which it must be manually removed before the surface may again be used. The raking and removal of such deposits is a laborious and time-consuming task which increases substantially the expense of the aeration operation.

In view of the foregoing, it is a first object of the present invention to provide a turf-aerating apparatus which is adapted to punch aeration openings without compacting the turf and without disturbing the adjoining lawn surface.

A further object of the invention is to provide a turf aerating apparatus as described which efficiently removes turf cores from the punched aerating openings and which collects all of the removed cores, thus eliminating the need for raking or similar clean-up operations.

Another object of the invention is to provide a turf-aerating apparatus as described of a simple construction which requires a minimum amount of maintenance.

Additional objects and advantages of the invention will be more readily apparent from the following detailed description of embodiments thereof when taken together with the accompanying drawings wherein:

FIG. 5 is a fragmentary view taken along line 5—5 of FIG. 1 showing details of the core collecting box;

FIG. 6 is a perspective view showing the coacting portions of the core collecting box and the supporting elements therefor;

FIG. 7 is an enlarged side view showing the details of a typical coring tine assembly;

FIG. 8 is a perspective view of a tine assembly chain anchor;

FIG. 9 is a plan view taken along line 9—9 of FIG. 7;

FIG. 10 is an end view of a tine assembly with the turf plate in the extended position;

FIG. 11 is a perspective view of a tine assembly including the connecting arm and core chute;

FIG. 12 is a view showing schematically the rotary path of a tine assembly and the manner in which the cores are delivered to the collecting box;

FIG. 13 is a sectional side view of a tine engaged in the turf showing the manner in which the turf cores are ejected upwardly into a core chute;

FIG. 14 is a side elevational view partly in section showing a modified type of tine assembly;

FIG. 15 is a view of the modified assembly of FIG. 14 showing the action of the assembly when the tine is engaged with the ground; and FIG. 16 is a perspective view of a rubber turf-detaining element of the modified tine assembly embodiment.

Figure 1:
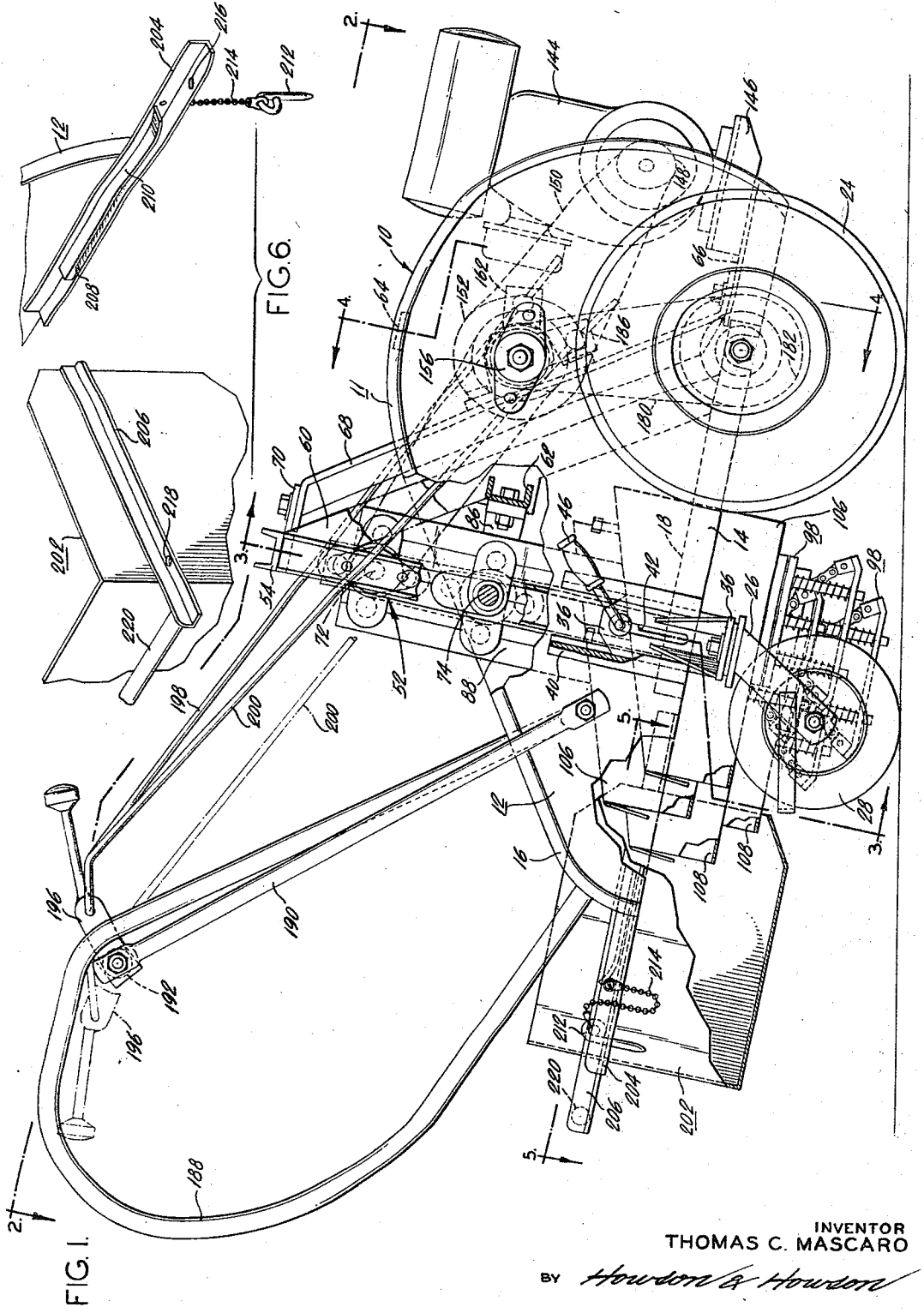
FIG. 1 is a side elevational view of a turf-aerating apparatus embodying the present invention having portions cut away to reveal interior details.

The turf-aerating apparatus of the present invention in brief comprises a motor driven wheeled carriage which in the described embodiment is adapted to be guided by means of rearwardly extending handles. Downwardly depending from motor driven crankshafts on the carriage are a plurality of coring tine assemblies adapted for punching the ground beneath the carriage. A rotary motion is imparted to the tine assemblies by the crankshafts at a rate coordinated with the driven speed of the carriage so that the individual tines during contact with the ground have no forward motion.

Considering the details of the apparatus shown in the drawings and with specific reference to FIGS. 1–4, the turf aerator 10 includes a wheeled carriage 11 comprising spaced parallel side panels 12 having straight substantially horizontal lower edges 14 and irregularly curved flanged upper edges 16. Frame angles 18 are secured to the inner faces of the side panels along the central portions of the lower edges 14. Extending transversely to the side panels 12 and journaled by bearings 20 thereon is the axle 22, the outer ends of which support the rubber tired wheels 24.

Auxiliary wheel assemblies 26, which may be selectively raised or lowered for a purpose described hereinafter, depend from the rear portions of the side panels. Each wheel assembly 26 includes a rubber tired wheel 28 supported by an axle 30 within a yoke 32. The yoke is pivotally attached by a vertical bolt 34 to an angle bracket 36, the vertical portion 38 of which is slidably secured to the outer face of a side panel 12 by the spaced, grooved guide elements 40. A vertical slot 42 in the vertical portion 38 of the bracket permits the passage of the threaded end 44 of the adjusting handle 46 which extends through the side panel and engages a threaded nut 48 welded to the inner face thereof. A flange 50 on the handle shaft bears against the bracket adjacent the slot 42 to lock the wheel assembly in the desired position.

A puncher mechanism 52 adapted for punching and removing turf cores is supported on the above-described carriage 11 by a puncher frame 54 which includes vertical side channels 56 secured at their lower ends to the frame angles 18. The side channels 56 are connected at their upper ends by the horizontal channel 58. Extending diagonally forward from the upper ends of the side channels 56 to the frame angles 18 are the supports 60, between which extends the transverse support channel 62. Other transverse bracing elements include the cross tie 64 between the upper edges of the side panels 12, and the engine support plate 66 extending between the side panels at the front lower corners thereof. An intermediate support channel 68 extends between the center of a plate 70 projecting from beneath the channel 58, diagonally to the motor support plate 66.

The punching mechanism 52 comprises spaced upper and lower horizontal crankshafts 72 and 74 extending between and respectively journaled by bearings 76 and 78 on the puncher frame side channels 56. The upper crankshaft 72 is centrally supported by the bearing 80 on the bearing support 82 bolted to the channel 58. Similarly, the lower crankshaft 74 is centrally journaled in the bearing 84 on the bearing support 86 bolted to the channel 62.

The upper and lower crankshafts 72 and 74 are identical and are spaced vertically so that the attachment of the crank arm 88 thereto will result in a continuously vertical dispostion of the crank arms during rotation of the crankshafts. Each of the crank arms as shown most distinctly in FIG. 11 is made up of two adjoining bar stock elements 90 and 92 which are secured together by bolts 94, bores 96 therein being spaced apart the same distance as the crankshafts and adapted to rotatably engage the crank elements.

Attached to the lower end of each crank arm 88 is a coring tine assembly 98 which, as shown most fully in FIGS. 7–11, includes an upper clamping plate 100 to which the crank arm 88 is attached by means of angles 102 and bolts 104. Secured between the angles 102 and the upper clamping plate 100 is the bottom of the core chute 106 which, as shown most clearly in FIG. 11, encloses the lower end of the crank arm and includes a rear opening 108 for rearward passage of the cores into a core collecting box described hereinafter.

A lower clamping plate 110 directly beneath and parallel to the upper clamping plate 100 is adapted as shown in FIG. 7 for supporting the downwardly directed coring tines 112, the tines being positioned in holes 114 in the lower clamping plate with the flange 116 of each of the tines being clamped between the upper and lower clamping plates. Holes 118 in the upper clamping plate aligned with the holes 114 permit passage of the turf cores from the hollow tines into the core chute 106. The lower clamping plate 110 is secured in the clamping position by the bolts 120 at the front and rear edges thereof which extend through holes 122 in the top of the core chute to permit removal of the lower clamping plate for replacement of the tines. A nut 124 welded to each bolt 120 in conjunction with a lock washer 126 locks the lower clamping plate in position. Stops 128 prevent the bolts 120 from becoming disengaged from the upper clamping plate.

Each tine assembly includes four spaced hollow tines 112 which are tapered towards their lower sharpened ends 130 to prevent jamming of the turf cores during upward passage therethrough, A turf plate 132 is resiliently mounted adjacent the lower ends 130 of the tines, the tines extending with adequate clearance through holes 134 therein. The turf plate 132 is urged downwardly by the compression springs 136 surrounding each tine and extending between the turf plate and the lower clamping plate. The downward travel of the turf plate is limited by the chains 137 at each end thereof extending between the chain anchors 138 on the turf plate 132 and the chain anchors 140 on the lower clamping plate 110, each of the latter anchors as shown in the perspective view of FIG. 8 including a bar 142 welded transversely thereacross to hold the chain off center in the extended position.

The drive means for driving the crankshafts 72 and 74 in rotation also drives the axle 22 at a speed which coordinates the punching action of the punching mechanism with the forward travel speed of the carriage. The drive means includes a gasoline engine 144 secured to the channel 146 on the engine support plate 66. The engine drive sprocket 148 is connected by means of a chain 150 to the sprocket 152 on the clutch shaft 154 journaled between the side panels 12 by the bearings 156 on the side panels and bearing 158 on the support channel 68. A clutch 160 on the shaft 154 is operable by means of the clutch actuator 162 to transmit power from the clutch shaft to a sprocket 164. A chain 166 engaging the sprocket 164 travels over the sprocket 167 on one end of the upper crankshaft 72 and a sprocket 168 on the lower crankshaft 74 to drive the crankshafts at the same rotational speed.

A sprocket 170 on the opposite end of the upper crankshaft 72 is engaged by a chain 172 for driving a sprocket 174 on the overrunning clutch 176. A sprocket 178 on the driven element of the clutch 176 is connected by means of a chain 180 to a sprocket 182 on the differential 183 on the axle 22. For driving the axle 22 with the punching mechanism stopped, a clutch 184 on the shaft 154 is operable by means of the clutch actuator 186 to transmit a driving force from the shaft 154 through the sprocket 178 to the axle 22, the sprocket 174 remaining at rest.

Figure 2:
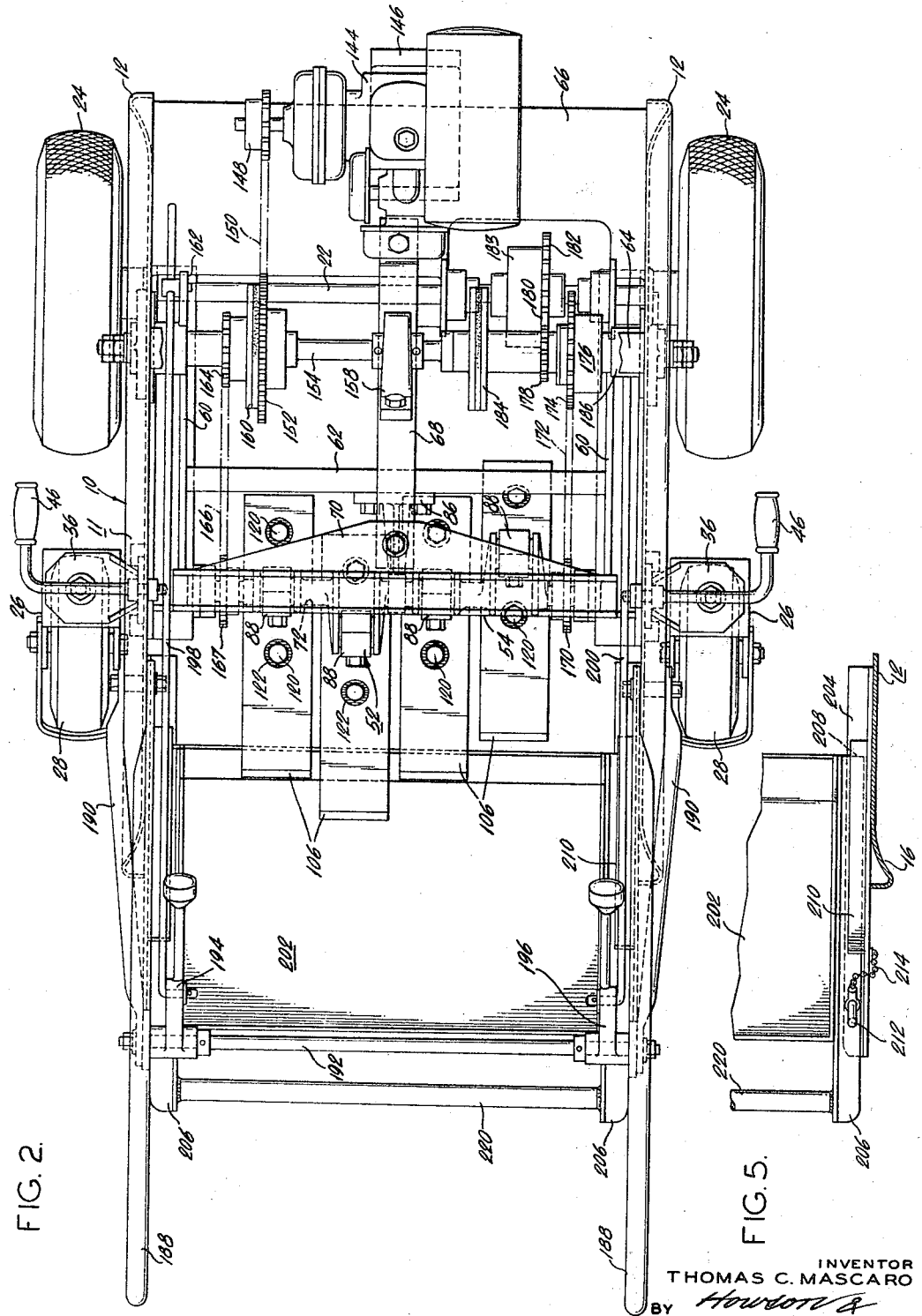
FIG. 2 is a plan view taken along line 2—2 of FIG. 1 of the apparatus shown in FIG. 1.

Tubular bowed handles 188 are bolted to the inner faces of the rear portions of the side panels 12 for guiding and maneuvering the apparatus. Clutch control support arms 190 extend from the outer faces of the side panels 12 adjacent the handles and are joined at their upper ends as shown in FIG. 2 by the transverse shaft 192. Clutch control levers 194 and 196 pivotally mounted on the shaft 192 respectively control the clutch operating rods 198 and 200 which in turn are connected with the clutch actuators 162 and 186.

As shown in FIGS. 1, 5 and 6, a core collecting box 202 is removably supported at the rear of the coring tine assemblies on the angle supports 204 extending from the lower edges of the side panels 12. Angle runners 206 on the sides of the box 202 are adapted to slide on the supports 204, being positioned and held thereon by the stop 208 and the cover strip 210. Pins 212 attached to the angles 204 by chains 214 are inserted in the aligned holes 216 and 218 respectively of the angles 204 and runners 206 to secure the box in the proper position. The box is open along the front face thereof to receive the rear ends of the core chutes 106. The runners 206 extend rearwardly beyond the back face of the box to support a transverse handle 220.

Figure 3:
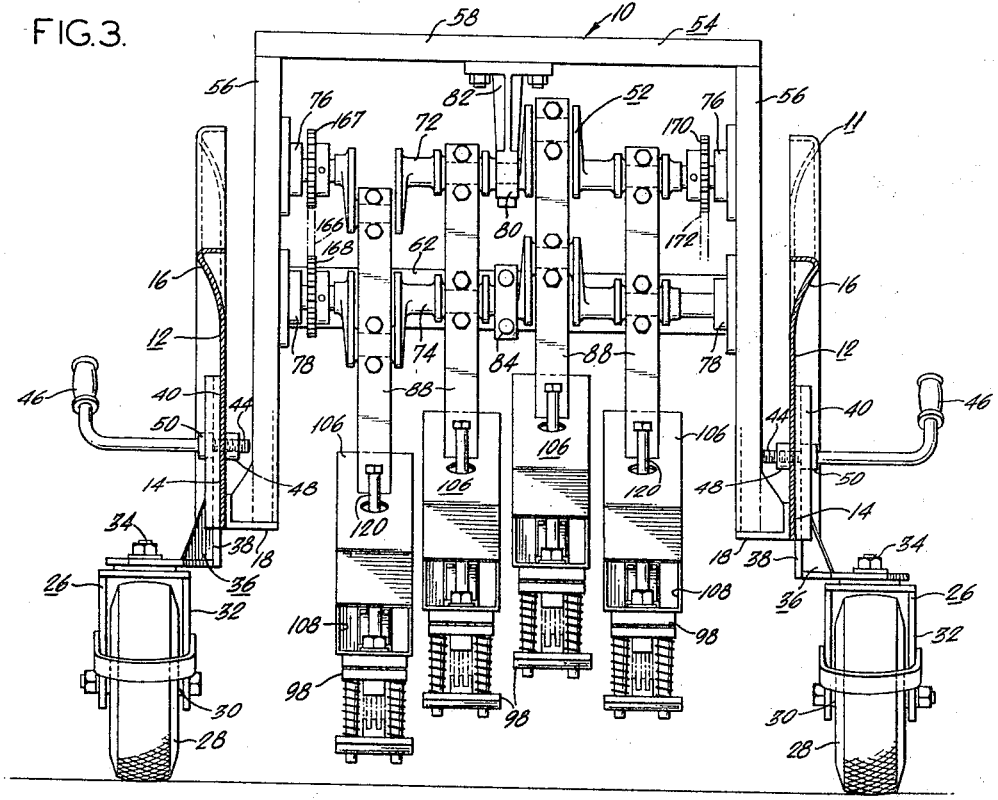
FIG. 3 is a view partly in section taken along line 3—3 of FIG. 1.
Figure 4:
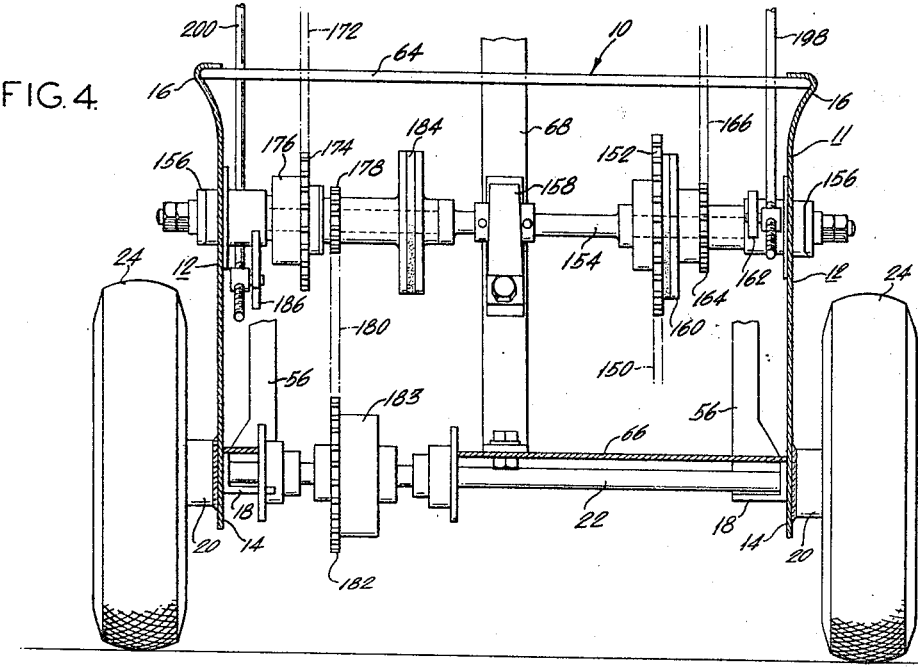
FIG. 4 is a view partly in section taken along line 4—4 of FIG. 1.

For operation, with the wheel assemblies 26 in the lowered position as shown in FIGS. 1 and 3 to raise the tine assemblies above the ground level, the engine 144 is started and by engaging the clutch 184 by means of the control lever 196, the apparatus may be driven to the lawn area to be aerated. The punching mechanism is at rest during such transport since the overrunning clutch 176 prevents the driving of the sprocket 174 by the driven sprocket 178.

For aerating operation, the clutch 184 is disengaged, the wheel assemblies 26 are raised to lower the tine assemblies into the operating position, and the clutch 160 is engaged by means of the control lever 194 to actuate the punching mechanism. The resulting rotation of the crankshafts 72 and 74, as illustrated in FIG. 12, imparts a rotary motion to the crank arms and attached tine assemblies, with the crank arms always remaining in a vertical disposition. As the tine assemblies successively make contact with the ground, as shown in FIGS. 12 and 13, a turf core 222 is formed within each hollow tine and lifted upwardly upon retraction of the tine, spring loaded turf plates preventing the tearing of the turf around the openings formed by the tines. The tapered hollow tines, as shown in FIG. 13, permit the upward passage of the cores 222 into the core chute, the cores being advanced upwardly into the chute by the entrance of succeeding cores into the tines. The cores pass through the rear openings 108 of the core chutes into the core collecting box 202 as illustrated in FIG. 13, the box as indicated above being readily removable for emptying.

As set forth above, the drive mechanism coordinates the rotary motion of the tine assemblies with the driven speed of the carriage so that the tines during contact with the ground move only in a vertical plane to punch the turf cores.

FIGS. 14–16 show an alternate tine assembly construction wherein resilient turf detaining elements 224 are employed in place of the turf plates 132. Each turf detaining element 224 is characterized by a cylindrical body 226 having an upper flange 228 and a larger lower flange 230 at the ends thereof. Each element is adapted to fit over one of the tapered tines, with the upper flange secured to the underside of the lower clamping plate. In the relaxed condition, the detaining element is slightly shorter than the tine. Vertical slots 232 in the cylindrical body portion facilitate the compression of the detaining element as shown in FIG. 15 during engagement of the tine with the turf. The lower flange 230 maintains a resilient downward pressure on the turf around the tine to prevent its pulling out during the withdrawal of the tine. The tine-receiving central hole 234 of the detaining element should be flared outwardly at its lower end to provide additional clearance for movement of the tine.

Although rubber is the material preferred for the detaining elements, other suitable resilient materials could be used. The resilient detaining elements are lighter, less expensive and more readily assembled than the turf plate arrangement described above and can be easily and inexpensively replaced should they become worn or damaged.

Manifestly, changes in details of construction can be effected by those skilled in the art without departing from the spirit and the scope of the invention as defined in and limited solely by the appended claims.

I claim:

1. A coring tine assembly for turf-aerating equipment comprising spaced parallel upper and lower clamping plates, a plurality of aligned spaced holes in said clamping plates, a plurality of flanged hollow coring tines passing through the holes in said lower clamping plate and communicating with the aligned holes of said upper plate, means detachably securing said clamping plates in clamping relation with respect to the flanges of said coring tines, a turf-detaining element associated with each coring tine, each turf-detaining element comprising an elastic cylindrical body having a central hole adapted to coaxially overlie a coring tine, a flange on the lower end of said cylindrical body, said flange being adapted during penetration of the tine into the turf to resiliently engage the surrounding turf and maintain the level disposition thereof during withdrawal of the tine.

2. A coring tine assembly as claimed in claim 1 including spaced vertical slots in each said turf-detaining element cylindrical body to facilitate the compression of each turf-detaining element during the punching stroke of the respective coring tine.

References Cited

FOREIGN PATENTS 475,085    4/1929    Germany.

ABRAHAM G. STONE, *Primary Examiner.*

JIMMIE R. OAKS, *Assistant Examiner.*

U.S. Cl. X.R.

172—97